A. B. MOE.
POULTRY TRAP NEST.
APPLICATION FILED DEC. 8, 1913.
1,162,381. Patented Nov. 30, 1915.
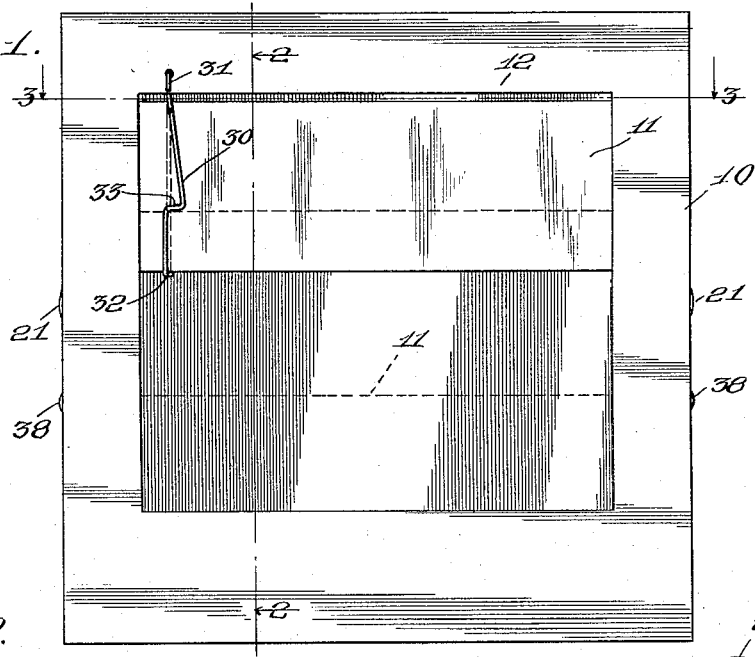
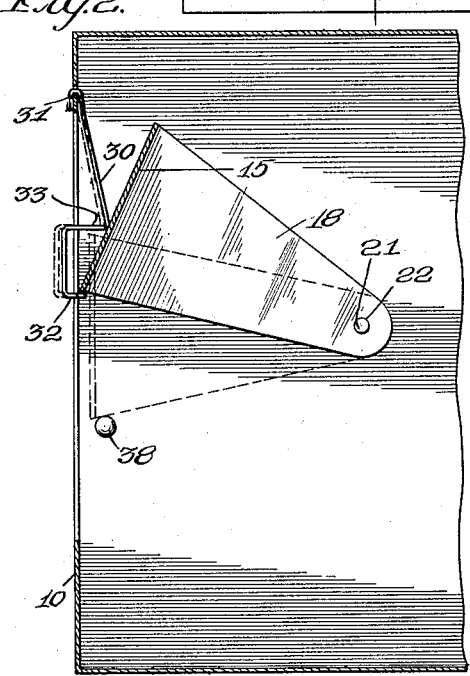
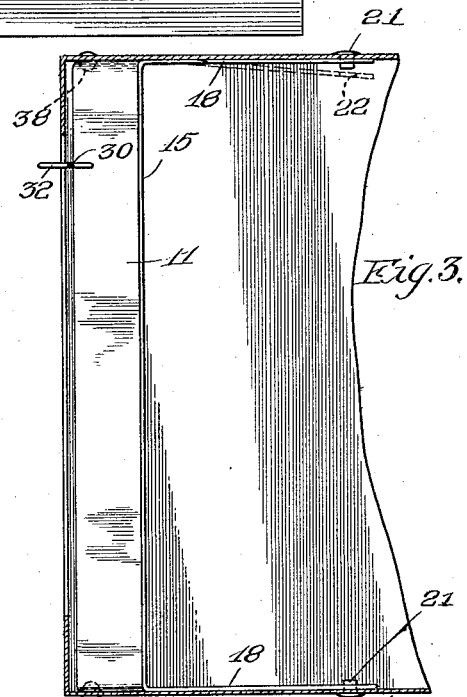
Inventor
Aaron B. Moe

UNITED STATES PATENT OFFICE.

AARON B. MOE, OF CHICAGO, ILLINOIS, ASSIGNOR TO OTIS AND MOE MANUFACTURING COMPANY, A CORPORATION OF ILLINOIS.

POULTRY TRAP-NEST.

1,162,381.   Specification of Letters Patent.   Patented Nov. 30, 1915.

Application filed December 8, 1913. Serial No. 805,241.

*To all whom it may concern:*

Be it known that I, AARON B. MOE, a citizen of the United States, residing at 5340 West Madison street, in Chicago, county of Cook, and State of Illinois, have invented new and useful Improvements in Poultry Trap-Nests, of which the following is a specification.

Poultry raisers have found that it is sometimes advisable to provide nests for laying hens and other fowls with means for trapping the fowls in the nests so that they may be compelled to remain there any desired length of time.

The present invention therefore relates to a nest for poultry, of such construction that when a fowl enters it the trapping device will operate to detain it there until released by some person attending to the nest.

A device embodying the principles of the present invention is illustrated in the accompanying drawings in which;

Figure 1 is a view of the complete device in front elevation. Fig. 2 is a vertical section on the line 2 of Fig. 1. Fig. 3 is a horizontal section on the line 3 of Fig. 1.

As shown in said drawings the trap-nest comprises a box-like structure or inclosure 10, having a rectangular top, bottom and sides and made very simply of sheet metal or other suitable material to provide a nest for the fowl; such nest housing or box being closed on all sides except the front in which is made an opening 11 somewhat smaller than the outlines of the box so as to leave a marginal wall 12 surrounding the opening. Arranged within the box in a position to extend across and obstruct this opening is a movable shutter 15, which is hinged in such manner that it may be raised or lowered; its lowered position placing it horizontally across the middle of the opening 11 so as to prevent the passage of a fowl therethrough, and its upper position allowing the fowl to crawl under it. This shutter is made preferably of metal and comprises a single strip of material of such length and width as to obstruct the opening to the desired extent, and having its ends bent inward at right angles and parallel to each other to form triangular extensions 18 which are pivoted to the sides of the box 10. For this purpose rivets or studs 21, 21 are fixed in the side walls of the box and extended inward to form pivot pins for the ends of the extensions 18 and openings 22 are made in the latter so that by springing them toward each other, as indicated by the dotted lines in Fig. 3, they may be engaged or disengaged from the rivets 21; and if the trapping part of the device is not needed it may be entirely removed from the nest box 10 and readily replaced whenever desired.

A trigger or catch 30 is arranged to hold the shutter 15 in its raised position, such trigger or catch comprising a piece of wire with its upper end bent into a hook 31 and engaged in an opening through the marginal wall 12 above the opening 11; and the lower part of such catch is bent as shown in Fig. 2, forming a hook or rest 32, and above it a shoulder 33. When the shutter 15 is raised to permit the entry of a fowl into the nest, its lower edge is allowed to rest on the hook part 32 of the catch, as shown in Fig. 2, and the trap is then set. The fowl, in entering, rubs its back against the lower edge of the shutter, slightly raising it, and permitting the latch 30 to swing forward, by its own weight, into the position indicated by the dotted lines; so that when the fowl has passed beneath the shutter and no longer supports it, it will descend into its lower position to bar the opening 11 and retain the fowl in the nest. In this position also the upper edge of the shutter will engage beneath the horizontal shoulder 33 of the latch 30 and prevent the shutter from being again raised. The hook 31 is engaged in its opening loosely enough to permit the latch to swing freely the necessary distance to catch and release the shutter, so that when the shutter is supported by the part 32 of the latch, the frictional engagement of this part with the edge of the shutter will prevent the latch from swinging forward until it is released by the further raising of the shutter by the fowl, as above described. The hook 31 is so formed however as to limit the swinging movement of the latch 30, so that when the shutter is down the latch will always stay in position to prevent it from rising, notwithstanding that the nest box 10 may be inclined forward; and the descent of the shutter from its raised position is permitted by the springing forward of the latch to allow the shutter to pass under its shoulder 33.

A stop or rest 38 supports the shutter 15 in its lower position and limits its downward movement.

I claim as my invention:

1. A trap nest including a compartment open at one end thereof, a U-shaped guard having the terminals thereof pivotally mounted in the sides of the compartment, and a hook member pivotally depending from the top of the compartment adjacent the opening for alternately receiving said guard and preventing upward movement of the guard after the latter has been released by a fowl entering the compartment.

2. A trap nest including a compartment open at one end thereof, a U-shaped guard having the terminals thereof pivotally mounted in the sides of the compartment adjacent the opening for preventing the escape of a fowl from the interior thereof, a U-shaped supporting member pivotally mounted on the top of the compartment adjacent the opening, hooks formed on the terminals of said supporting member disposed in front of said opening for alternately receiving the vertex of the guard to permit a fowl to enter the compartment and release the guard and thus prevent upward movement of the guard after the latter has been released.

3. A trap nest including a compartment open at one end, a guarding member pivotally mounted in the sides of said compartment, said guarding member being substantially U-shaped having the vertex thereof disposed in front of said opening, and means pivotally mounted on the upper part of said compartment and disposed adjacent said opening for alternately supporting said guarding member and preventing movement of the guarding member after the latter has been released.

4. A trap nest including a compartment open at one end, a guarding member pivotally mounted in the sides of said compartment, said guarding member being substantially U-shaped and having the vertex thereof disposed in front of said opening, and a hook member pivotally mounted on the upper part of said compartment and disposed adjacent said opening for receiving the vertex of the guarding member, and means on said hook member for preventing the movement of the guarding member after the latter has been released.

5. A trap nest including a compartment open at one end, a guarding member pivotally mounted in the sides of said compartment, said guarding member being substantially U-shaped and having the vertex thereof disposed in front of said opening, a supporting member pivotally mounted on the upper part of said opening, means on the ends of said supporting member for receiving the vertex of said guarding member, and means on said supporting member for preventing movement of the guarding member after the same has been released.

In witness whereof, I have hereunto subscribed my name in the presence of two witnesses this 4th day of December, 1913.

AARON B. MOE.

Witnesses:
ETHEL NASON,
HILDEGARDE WALLMAN.

Copies of this patent may be obtained for five cents each, by addressing the "Commissioner of Patents, Washington, D. C."